United States Patent [19]
Petty

[11] Patent Number: 6,125,793
[45] Date of Patent: Oct. 3, 2000

[54] RESILIENT SAFETY DOG COLLAR

[76] Inventor: Kimberly T. Petty, 749 S. Lemay A3-150, Fort Collins, Colo. 80524

[21] Appl. No.: 09/131,355

[22] Filed: Aug. 10, 1998

[51] Int. Cl.[7] ............................. A62B 35/00; A01K 27/00
[52] U.S. Cl. ............................. 119/856; 119/863; 119/792
[58] Field of Search ..................... 119/856, 863, 119/864, 769, 792, 795

[56] References Cited

U.S. PATENT DOCUMENTS

| | | | |
|---|---|---|---|
| D. 270,488 | 9/1983 | Erdmann | D30/38 |
| D. 270,674 | 9/1983 | Erdmann | D30/39 |
| D. 297,577 | 9/1988 | Tozawa | D30/152 |
| 913,680 | 3/1909 | Belcher | 119/769 |
| 2,175,283 | 10/1939 | Cote | 119/856 |
| 2,612,139 | 9/1952 | Collins | 119/856 |
| 3,072,097 | 1/1963 | Morchand | 119/769 |
| 3,096,741 | 7/1963 | Ollstein | 119/769 |
| 4,141,322 | 2/1979 | Evans et al. | 119/856 |
| 4,167,156 | 9/1979 | Kupperman et al. | 119/856 |
| 4,224,901 | 9/1980 | Carey, Jr. | 119/856 |
| 4,266,511 | 5/1981 | Muench | 119/856 |
| 4,491,090 | 1/1985 | Almeida | 119/856 |
| 4,777,784 | 10/1988 | Ferguson | 54/34 |
| 5,150,667 | 9/1992 | Salidrigas | 119/856 |
| 5,247,906 | 9/1993 | Stevenson | 119/795 |
| 5,379,726 | 1/1995 | Mann | 119/793 |
| 5,467,743 | 11/1995 | Doose | 119/864 |
| 5,503,894 | 4/1996 | Brown | 428/128 |
| 5,551,380 | 9/1996 | Hodgson | 119/795 |
| 5,735,234 | 4/1998 | May | 119/795 |
| 5,826,547 | 10/1998 | Gajewska | 119/795 |
| 5,842,444 | 12/1998 | Perrulli | 119/770 |
| 5,873,328 | 2/1999 | Campbell | 119/798 |

*Primary Examiner*—Michael J. Carone
*Assistant Examiner*—Fredrick T. French, III

[57] ABSTRACT

A resilient safety dog collar including a bungee cord with a first male end and a second female end with a first aperture formed through the first end and a second aperture formed through the second end. Also included is an outside sleeve which has a male first end and a female second end with a central extent therebetween. A coupling is included along the length thereof for the majority of its extent to form a tubular opening. The second female end of the outside sleeve has a short planar extent terminating at a point with a plurality of holes therethrough in alignment with the axis of the outside sleeve. The outside sleeve has the bungee cord centrally located therewithin. Also included is an intermediate cylindrical sleeve having a first male end and a second female end located within the outside sleeve and encompassing the bungee cord and extending from within the first male end of the outside sleeve and extending therebeyond with the bungee cord also extending therebeyond.

4 Claims, 3 Drawing Sheets

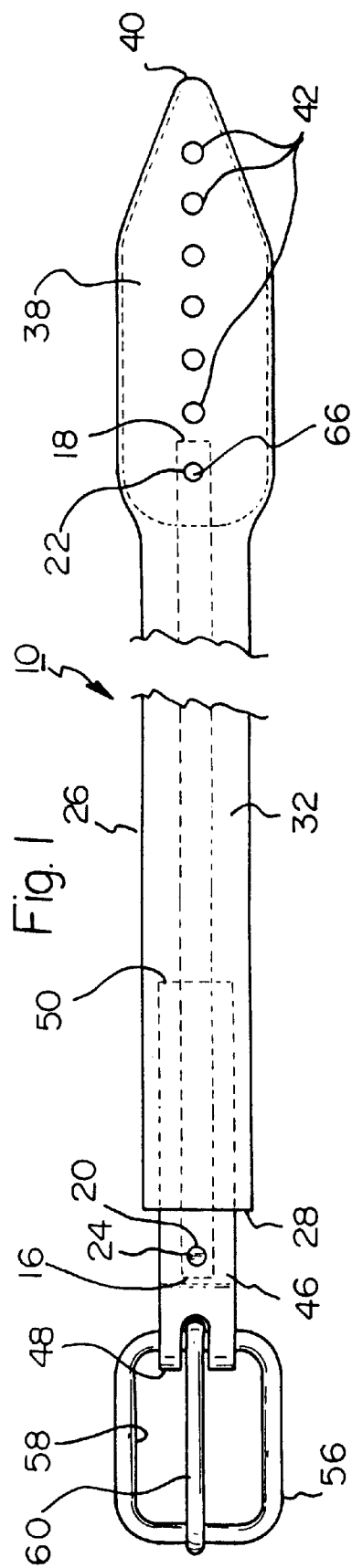
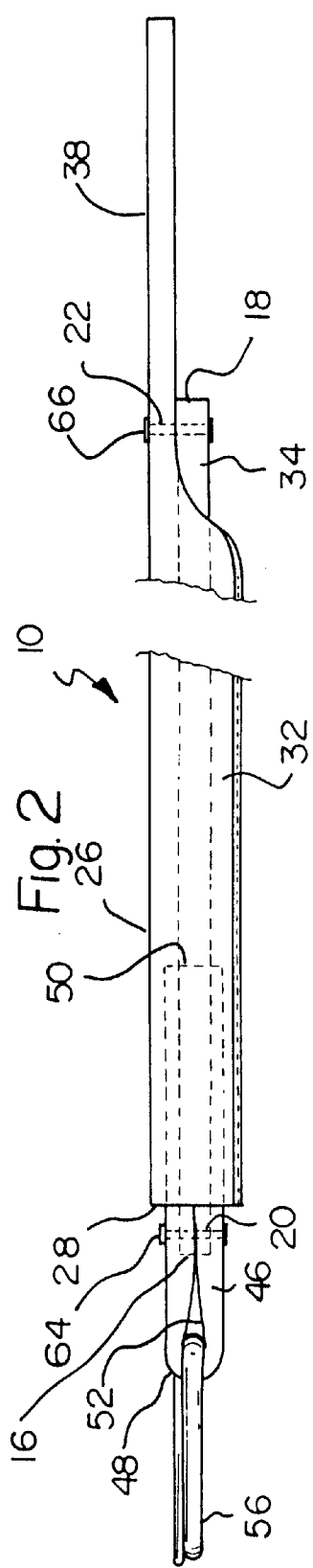

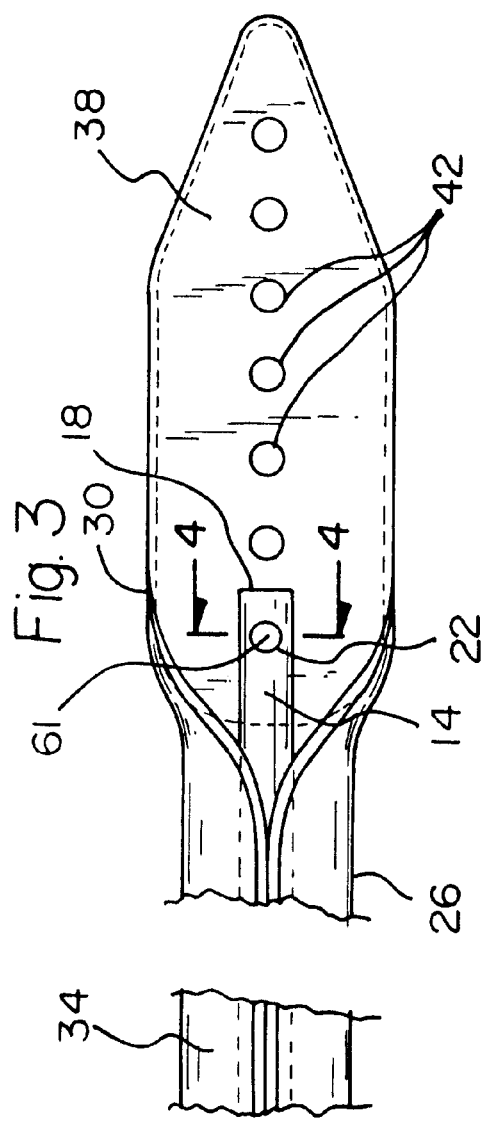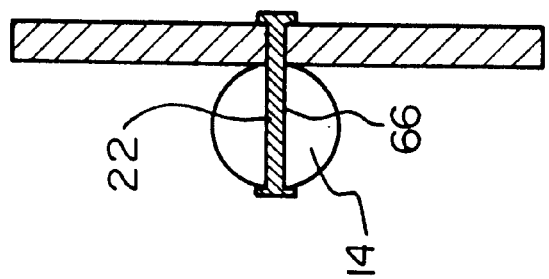

RESILIENT SAFETY DOG COLLAR

BACKGROUND OF THE INVENTION

1. Field of the Invention

The present invention relates to a resilient safety dog collar and more particularly pertains to allowing for limited flexibility of dog collars for increased safety and convenience.

2. Description of the Prior Art

The use of dog collars of known designs and configurations is known in the prior art. More specifically, dog collars of known designs and configurations heretofore devised and utilized for the purpose of increasing the safety, convenience and comfort of dog collars through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,917,049 to Peterson discloses a Safety Releasable Collar for Animals. U.S. Pat. No. 4,180,016 to George discloses a Safety Pet Collar. U.S. Pat. No. 2,612,139 to Collins discloses a Cat Collar. U.S. Pat. No. 3,086,268 to Chafin, Jr. discloses a Separable Two-Part Magnetic Connector. Lastly, U.S. Pat. No. 5,050,538 to Gurski, Jr. discloses a Break-Away Pet Collar. European Patent Application 286728 discloses a Collar for a Pet.

While these devices fulfill their respective, particular objectives and requirements, the aforementioned patents do not describe resilient safety dog collars of the nature described herein.

In this respect, the resilient safety dog collar of the present invention substantially departs from the conventional concepts and designs of the prior art, and in doing so provides an apparatus primarily developed for the purpose of allowing for limited flexibility of dog collars for increased safety and convenience.

Therefore, it can be appreciated that there exists a continuing need for a new and improved resilient safety dog collar which can be used for allowing for limited flexibility of dog collars for increased safety and convenience. In this regard, the present invention substantially fulfills this need.

SUMMARY OF THE INVENTION

In view of the foregoing disadvantages inherent in the known types of dog collars of known designs and configurations now present in the prior art, the present invention provides an improved resilient safety dog collar. As such, the general purpose of the present invention, which will be described subsequently in greater detail, is to provide a new and improved resilient safety dog collar and method which has all the advantages of the prior art and none of the disadvantages.

To attain this, the present invention essentially comprises a new and improved safety dog collar in combination with a cylindrical bungee cord. The bungee cord is fabricated of a flexible material with a first male end and a second female end with a first aperture formed through the first end and a second aperture formed through the second end. Also provided is an outside sleeve having a male first end and a female second end with a central extent therebetween. The outside sleeve is formed of a flexible material with a coupling along the length thereof for the majority of its extent to form a tubular opening. The second female end of the outside sleeve having a short planar extent terminating at a point with a plurality of holes therethrough in alignment with the axis of the outside sleeve, the outside sleeve having the bungee cord centrally located therewithin. Also provided is an intermediate cylindrical sleeve. The sleeve has a first male end and a second female end located within the outside sleeve. The sleeve encompasses the bungee cord and extends from within the first male end of the outside sleeve and extending therebeyond with the bungee cord also extending therebeyond. The sleeve is folded back upon itself with an opening. Additionally provided is a buckle having a rigid loop and a pivotable tongue located within the opening of the sleeve. Lastly provided is a pair of rivets including a first rivet extending through the sleeve and the first aperture of the bungee cord and a second rivet extending through the planar extent of the outside sleeve and the second aperture of the bungee whereby the tongue may be selected into a predetermined hole of the outside sleeve as a function of the size of the neck of the dog to receive the collar with the bungee adapted to selectively expand and enlarge the collar as a function of the forces placed upon it with the spacing between the rivets increasing with the increased forces.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved resilient safety dog collar which has all of the advantages of the prior art dog collars of known designs and configurations and none of the disadvantages.

It is another object of the present invention to provide a new and improved resilient safety dog collar which may be easily and efficiently manufactured and marketed.

It is further object of the present invention to provide a new and improved resilient safety dog collar which is of durable and reliable constructions.

An even further object of the present invention is to provide a new and improved resilient safety dog collar which is susceptible of a low cost of manufacture with regard to both materials and labor, and which accordingly is then susceptible of low prices of sale to the consuming public, thereby making such resilient safety dog collar economically available to the buying public.

Even still another object of the present invention is to provide a resilient safety dog collar for allowing for limited flexibility of dog collars for increased safety and convenience.

Lastly, it is an object of the present invention to provide a new and improved resilient safety dog collar including a bungee cord with a first male end and a second female end with a first aperture formed through the first end and a second aperture formed through the second end. Also included is an outside sleeve which has a male first end and a female second end with a central extent therebetween. A coupling is included along the length thereof for the majority of its extent to form a tubular opening. The second female end of the outside sleeve has a short planar extent terminating at a point with a plurality of holes therethrough in alignment with the axis of the outside sleeve. The outside sleeve has the bungee cord centrally located therewithin. Also included is an intermediate cylindrical sleeve having a first male end and a second female end located within the outside sleeve and encompassing the bungee cord and extending from within the first male end of the outside sleeve and extending therebeyond with the bungee cord also extending therebeyond.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the preferred embodiment of the resilient safety dog collar constructed in accordance with the principles of the present invention.

FIG. 2 is a top elevational view of the dog collar shown in FIG. 1.

FIG. 3 is an enlarged end view of the collar shown in FIGS. 1 and 2.

FIG. 4 is a cross-sectional view taken along line 4—4 of FIG. 3.

The same reference numerals refer to the same parts through the various Figures.

DESCRIPTION OF THE PREFERRED EMBODIMENT

Figure 5:
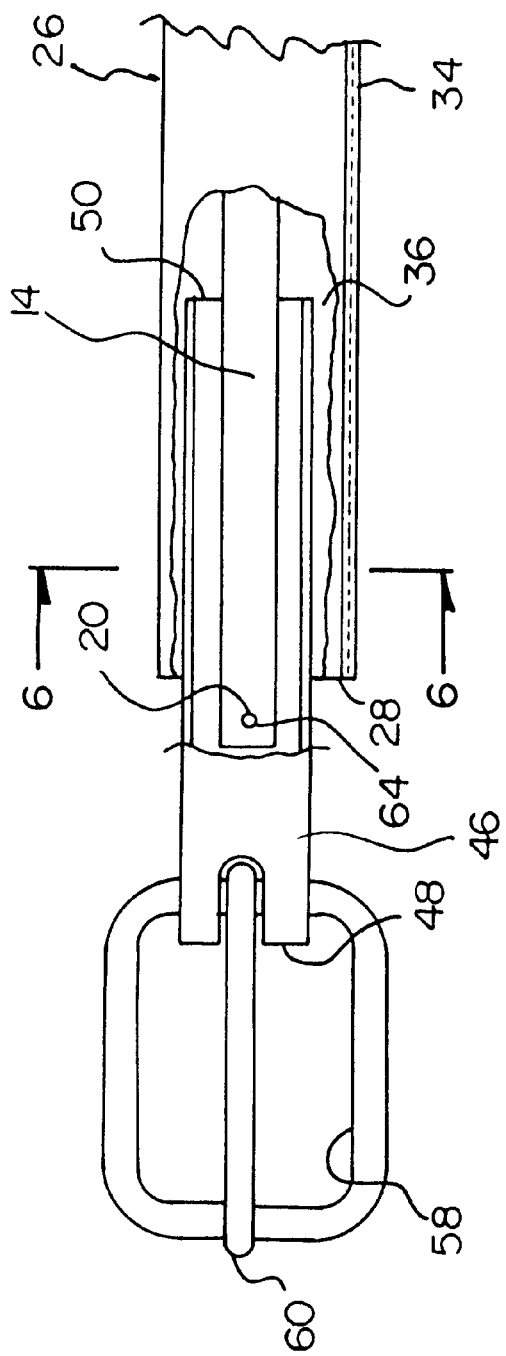
FIG. 5 is an elevational view of the first end of the collar with parts broken away to show certain internal constructions thereof.
Figure 6:
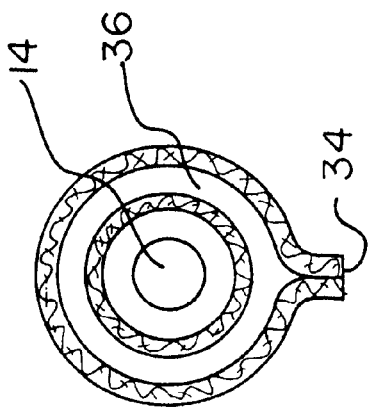
FIG. 6 is a cross-sectional view taken along line 6—6 of FIG. 5.

With reference now to the drawings, and in particular to FIG. 1 thereof, the preferred embodiment of the new and improved resilient safety dog collar embodying the principles and concepts of the present invention and generally designated by the reference numeral 10 will be described.

The present invention, the resilient safety dog collar 10 is comprised of a plurality of components. Such components in their broadest context include a bungee cord, an outside sleeve, an inside cylindrical sleeve, and a buckle. Such components are individually configured and correlated with respect to each other so as to attain the desired objective.

The new and improved safety dog collar 10 includes a cylindrical bungee cord 14. The bungee cord is fabricated of a flexible material with a first male end 16 and a second female end 18 with a first aperture 20 formed through the first end and a second aperture 22 formed through the second end.

Also provided is an outside sleeve 26 having a male first end 28 and a female second end 30 with a central extent 32 therebetween. The outside sleeve is formed of a flexible material with a coupling 34 along the length thereof for the majority of its extent to form a tubular opening 36. The second female end of the outside sleeve having a short planar extent 38 terminating at a point 40 with a plurality of holes 42 therethrough in alignment with the axis of the outside sleeve, the outside sleeve having the bungee cord centrally located therewithin.

Further provided is an intermediate cylindrical sleeve 46. The sleeve 46 has a first male end 48 and a second female end 50 located within the outside sleeve. The sleeve encompasses the bungee cord and extends from within the first male end of the outside sleeve and extending therebeyond with the bungee cord also extending therebeyond. The sleeve is folded back upon itself with an opening 52.

Additionally provided is a buckle 56 having a rigid loop 58 and a pivotable tongue 60 located within the opening of the sleeve.

Lastly provided is a pair of rivets 64 including a first rivet extending through the sleeve and the first aperture of the bungee cord and a second rivet 66 extending through the planar extent of the outside sleeve and the second aperture of the bungee whereby the tongue may be selected into a predetermined hole of the outside sleeve as a function of the size of the neck of the dog to receive the collar with the bungee adapted to selectively expand and enlarge the collar as a function of the forces placed upon it with the spacing between the rivets increasing with the increased forces.

As described hereinabove, the safety dog collar is a stretchable dog collar that is designed to avoid the tragedy of the dog being choked by its collar. The collar design features a stretchable cord surrounded by a leather exterior sheath. The leather portion of the collar features a separation in which one leather sleeve slides into of another, thus allowing the collar to stretch if pressure is applied. Various colors, sizes and designs can be used.

Other versions could be made from sturdy, solid rubber material for larger dogs and water-loving breeds. This style would include a rubber "O" from which the dog's license and other identification would hang, to eliminate the noise of jingling tags. In addition, a plain colorful round "bungee" cord collar with a carabineer-type closure might be appropriate for smaller dogs. Other versions include a flat, larger elastic style with a plastic quick-release catch; and, a nylon material collar with an insert of stretchable material and a quick-release clasp.

Modifications in the type of fasteners and closures, as well as colors and sizes could be considered for many of these versions. All versions have in common design properties which should cause the collar to come off if the dog becomes caught and pressure is applied. This collar could be a life-saving feature for a dog who jumps a fence while tied, leaps from the back of an open truck, or catches its collar on a stationary object or on another dog's tooth during a fight, or during play.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved safety dog collar comprising, in combination:

a cylindrical bungee cord fabricated of a flexible material having a first male end and a second female end with a first aperture formed through the first male end and a second aperture formed through the second female end;

an outside sleeve having a male first end and a female second end with a central extent therebetween, the outside sleeve being formed of a flexible material with a coupling along the length thereof for the majority of its extent to form a tubular opening, the second female end of the outside sleeve having a short planar extent terminating at a point with a plurality of holes therethrough in alignment with the axis of the outside sleeve, the outside sleeve having the bungee cord centrally located therewithin;

an intermediate cylindrical sleeve having a first male end and a second female end located within the outside sleeve and encompassing the first male end of the bungee cord and extending from within the first male end of the outside sleeve and extending therebeyond with a portion of the bungee cord also extending therebeyond, the intermediate cylindrical sleeve being folded back upon itself with an opening;

a buckle, having a rigid loop and a pivotable tongue, said buckle being located within the opening of the intermediate cylindrical sleeve; and a pair of rivets including a first rivet extending through the intermediate cylindrical sleeve and the first aperture of the bungee cord and a second rivet extending through the planar extent of the outside sleeve and the second aperture of the bungee whereby the tongue may be selected into a predetermined hole of the outside sleeve as a function of the size of the neck of the dog to receive the collar with the bungee adapted to selectively expand and enlarge the collar as a function of the forces placed upon it with the spacing between the rivets increasing with the increased forces.

2. A safety dog collar comprising:

a bungee cord having a first male end and a second female end with a first aperture formed through the first male end and a second aperture formed through the second female end;

an outside sleeve having a male first end and a female second end with a central extent therebetween, with a coupling along the length thereof for the majority of its extent to form a tubular opening, the second female end of the outside sleeve having a short planar extent terminating at a point with a plurality of holes therethrough in alignment with the axis of the outside sleeve, the outside sleeve having the bungee cord centrally located therewithin; and an intermediate cylindrical sleeve having a first male end and a second female end located within the outside sleeve and encompassing the first male end of the bungee cord and extending from within the first male end of the outside sleeve and extending therebeyond with a portion of the bungee cord also extending therebeyond.

3. The dog collar as claimed in claim 2 and further comprising a buckle, having a rigid loop and a pivotable tongue, said tongue being located within the opening of the intermediate cylindrical sleeve.

4. The dog collar as claimed in claim 2 and further comprising a pair of rivets including a first rivet extending through the intermediate cylindrical sleeve and the first aperture of the bungee cord and a second rivet extending through the planar extent of the outside sleeve and the second aperture of the bungee whereby the tongue may be selected into a predetermined hole of the outside sleeve as a function of the size of the neck of the dog to receive the collar with the bungee adapted to selectively expand and enlarge the collar as a function of the forces placed upon it with the spacing between the rivets increasing with the increased forces.

* * * * *